United States Patent [19]

Marchou

[11] 4,319,385
[45] Mar. 16, 1982

[54] FASTENING DEVICE OF THE CLAMP TYPE
[75] Inventor: Jacques R. Marchou, La Varenne Saint-Hilaire, France
[73] Assignee: Societe en nom collectif dite: Calmettes, Marchou & Cie, Malmaison, France
[21] Appl. No.: 44,947
[22] Filed: Jun. 4, 1979
[30] Foreign Application Priority Data Jun. 6, 1978 [FR] France ............................ 78 16913

[51] Int. Cl.³ ............................................ B65D 63/02
[52] U.S. Cl. ........................... 24/20 R; 24/20 TT; 24/16 PB; 24/255 SL
[58] Field of Search ............. 24/20 R, 20 TT, 16 PB, 24/255 SL

[56] References Cited

U.S. PATENT DOCUMENTS

| 712,765 | 11/1902 | Cole | 24/20 TT |
|---|---|---|---|
| 1,690,643 | 11/1928 | Lavender | 24/20 TT |
| 1,804,725 | 5/1931 | Walker | 24/20 TT |
| 2,163,016 | 6/1939 | Barker | 24/16 PB |
| 3,189,961 | 6/1965 | Heller | 24/20 TT |
| 3,293,709 | 12/1966 | Holton | 24/20 TT |
| 3,408,699 | 11/1968 | Reynolds | 24/16 PB |
| 3,501,814 | 3/1970 | Anderson et al. | 24/16 PB |
| 3,604,145 | 9/1971 | Zimmerman | 24/16 PB |
| 3,672,003 | 6/1972 | Morgan | 24/16 PB |
| 3,964,133 | 6/1976 | Wasserlein, Jr. | 24/20 R |
| 3,979,094 | 9/1976 | DeWitt | 24/16 PB |
| 4,053,965 | 10/1977 | Marchou | 24/20 TT |
| 4,128,918 | 12/1978 | Wenk | 24/20 TT |
| 4,183,120 | 1/1980 | Thorne | 24/20 TT |

FOREIGN PATENT DOCUMENTS

| 1500795 | 8/1969 | Fed. Rep. of Germany . | |
|---|---|---|---|
| 432957 | 9/1967 | Switzerland | 24/20 TT |
| 778861 | 7/1957 | United Kingdom . | |
| 932116 | 7/1963 | United Kingdom | 24/20 TT |

Primary Examiner—Victor N. Sakran
Attorney, Agent, or Firm—Lewis H. Eslinger

[57] ABSTRACT

A fastening device of the clamp type constituted by a strap of which the two ends are provided with complementary anchoring elements, each end further comprising a gripping device 5, 7, which permits to effect the tightening and to bring the anchoring elements 2, 3 into cooperation, by way of an appropriate tool such as tongs. The gripping device 7 of one of the ends 1b of the strap is constituted by a relief of which the area 7a joining it to the strap has a mechanical resistance which is less than that of the strap.

5 Claims, 3 Drawing Figures

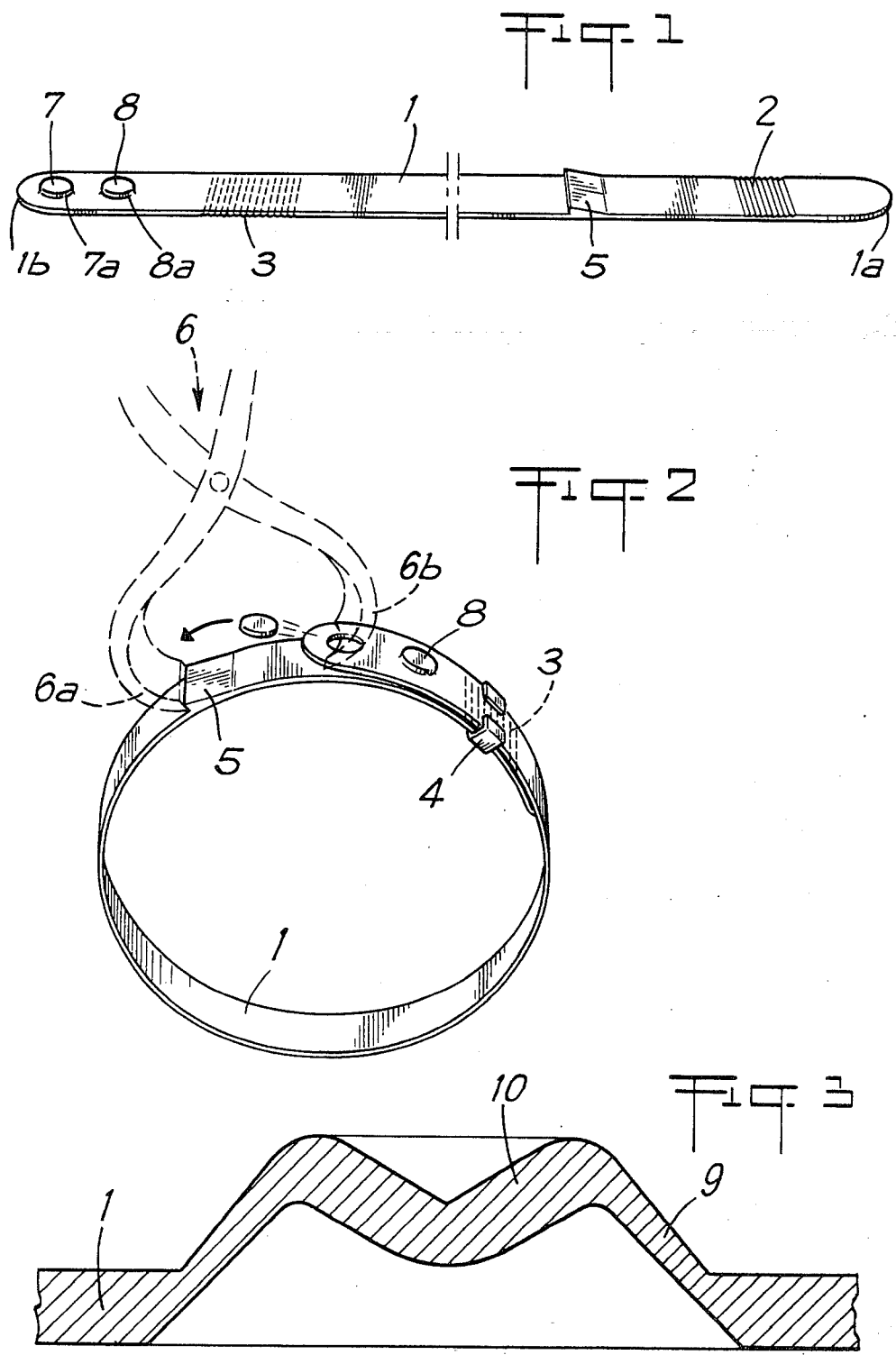

FASTENING DEVICE OF THE CLAMP TYPE

Many types of clamps are already known, and in particular from French Pat. No. 78 18082, corresponding to U.S. Pat. No. 4,053,965, for use in the manufacture of electrical domestic appliances or in the motorcar industry, to ensure for example the tight connection of two pipes, one of which is made of flexible material. In particular, clamps are known which consist of a strap element wound and made of flexible material, such as metal. The ends of such a clamp are provided at least on their opposite faces, with additional anchoring means, such as suitably directed teeth. In general, these ends are held in contact with each other by means of a clip or such like, which makes it possible to hold the clamp in its tightened position.

The fitting of such fastening means is generally ensured by special tongs or the like, the jaws of which cooperate with gripping means provided on the clamp, close to its ends, or simply pull on the end of the strap which is uncovered after winding, whilst preventing said latter, by any appropriate means, to slip on the article to be clamped.

The clamp according to the aforesaid patent permits to tighten with the necessary accuracy, and to apply rapidly and easily a precise tightening, as may be required for example in the motorcar industry. In addition, a simple examination of the clamp shows whether this result has been arrived at, so that there is a "display of the stress".

Said prior clamp however, necessitates, because of the conformation of the gripping means provided on the free end of the clamp, the tearing of one part of the strap. There results a danger of aggressivity for the user who may get hurt whenever his hands touch the torn end of the clamp.

Also, the aforesaid patent recommended the successive use of several gripping means situated on the free end of the strap, especially with a view to tighten the clamp. However, such tightening could only be effected with a torque greater than the torque of the initial tightening because of the nature of the gripping means provided.

The present invention makes improvements to the already known clamps and in particular to those described in the aforesaid patent, so as to overcome the two aforesaid disadvantages.

According to the invention, one at least of the gripping means placed at the two ends of the strap, and preferably the one situated on the external free end of the strap, is constituted by a relief formed in the strap, by stamping for example, the area joining the relief to the strap having a mechanical resistance which is less than that of the strap.

No particularly complicated tools or equipment are necessary to either produce or use the invention. For example, the known methods of clamp production by dieing, stamping or other similar methods are suitable to produce the invention. As to the tightening tool, this only needs to have, as is well known, members which complement the gripping means, to cooperate with the ends of the strap.

The invention will be better understood and secondary characteristics and advantages will emerge on reading the following description of one advantageous embodiment.

Reference will also be made to the accompanying drawing in which:

FIG. 1 is a perspective view of a clamp according to the invention, before being fitted, FIG. 2 is a perspective view of the same clamp once tightened, where the sleeve to be tightened is not shown, FIG. 3 is a cross-sectional view of an advantageous relief formed in the strap.

Such as is illustrated, a clamp is composed essentially of a flat strap 1, which may be made of metal, and is of constant width. Each of its ends 1a and 1b contains toothed portions 2 and 3, which are means to cooperate with one another after the strap is wound around the article to be clamped. If necessary, the teeth can be held in engagement by a clip 4 or something similar, as shown in FIG. 2, which is generally fitted before the clamping.

Behind the toothed portion 2, with respect to the corresponding end 1a, there is provided an asperity 5, which may be stamped, and constitutes a gripping means, and more precisely, a point of support for one of the jaws 6a of a tightening tool, as can be seen in FIG. 2. The other jaw 6b will cooperate with the end 1b corresponding to the toothed portion 3, and this in the conditions which will be explained hereinafter.

Between the end 1b and the toothed portion 3, which latter is found on a face of the strap 1 not shown in FIG. 1, and which is meant to constitute the inner face of the clamp shown in FIG. 2, there is provided a plane portion which comprises elements adapted to be gripped by the tightening tool.

To this effect, on the embodiment given by way of example, two bosses 7 and 8 are provided, and form reliefs on the outer face of the external free end of the clamp after the strap is wound. Said bosses are preferably situated on the longitudinal axis of the strap, and may be produced by stamping, they are shaped substantially as a truncated cone, or can be cylindrical or spherical. The diameter of the area 7a–8a where the bosses are joined to the plane of the strap 1 is determined so that said area has a mechanical resistance, and in particular to tearing, which is less than that of the strap itself. Said diameter also determines, as will be seen hereinafter, the degree of tightening of the clamp after it is fitted.

Each boss 7-8 thus constitutes a means for gripping the external free end of the strap, via the jaw 6b of the tightening tool.

To fit the clamp, the tightening tool 6 is placed as diagrammatically illustrated in FIG. 2, its jaw 6a resting on the shoulder 5, whilst the jaw 6b caps the end boss 7.

During the tightening operation, the teeth in the two portions 2 and 3 engage successively into one another. When the tightening force exerted by the tool becomes too great, the mechanical resistance of the joining area 7a of the boss 7 becomes insufficient to withstand it.

The cap of the boss 7 is then torn or cut off and the jaw 6b is no longer in holding contact with the strap. A hole then appears in the place of the boss 7. The fitting of the clamp is completed and it stays in its tightened position by the cooperation of the teeth of portions 2 and 3. The jaw 6b of the tool ensures a suitable trimming of the edge of the hole replacing the boss 7, which is thus completely safe for the user; the mere sight of this hole makes it possible to control that the clamp was tightened under the desired stress.

The existence of the second boss 8 makes it possible, if necessary, to repeat the tightening operation, for example after the tightened member has been used for a certain time. This arrangement is particularly useful for connecting flexible pipes conveying fluids under pressure. In such a case, the second boss 8 will be generally identical to the first boss 7, but in some cases, it will be advantageous to provide a boss 8 of which the mechanical resistance in the joining area 8a is greater than that in the joining area 7a.

An advantageous arrangement concerning the shape of the bosses 7 and 8 should also be pointed out.

As can be seen in FIG. 3, a boss comprises, besides its outer substantially truncated-cone shaped part 9, an inner cup-shaped portion 10.

With this arrangement, it is possible, for a given diameter of the area joining the boss to the strap 1, to increase the resistance to tearing. This is how, for example, a cylindrical or conical boss with a diameter of 5 mm, which is formed in a metal strap of 0.8 mm thickness, can oppose a resistance of about 1500 N to tearing. The presence of an inner cup makes it possible to increase that resistance up to about 2500 N. Of course, the diameter and the depth of the cup 10 will be established in relation to the desired resistance to tearing, which in the end means in relation to the required tightening stress of the clamp.

Quite obviously, in certain special cases, one, two or more successive bosses or reliefs may be provided, of which the joining areas in the plane of the strap, create an area where the mechanical resistance is less than that of the strap proper. Moreover, the reliefs or bosses which have been described could be located on the inner face of the outer end of the clamp, or even on the inner end of the latter, to replace the shoulder 5.

And quite obviously also, the invention is not limited to the arrangements described to fasten together the two ends of the strap, but on the contrary, it covers all possible cases of application of the display of the stress by means of reliefs which are removed during the tightening of the clamp.

What is claimed is:

1. A fastening device of the clamp type, comprising a strap adapted to be wound about an object, said strap including opposed ends with a respective end portion at each end having complimentary anchoring means for maintaining said strap in a wound configuration about said object, each end portion further having gripping means adapted to be engaged by a tightening tool to tighten said strap about said object and to bring the anchoring means of one end portion into engaging relation with the anchoring means of the opposed end portion of the opposed end, one of the gripping means including a relief formed in the strap with the relief being joined along a peripheral portion thereof to the strap, said peripheral portion having a mechanical resistance to being torn which is less than that of the strap, wherein said relief is torn off of said strap by the tool along said peripheral portion during the tightening operation when said strap is tightened about said object to a desired tightness.

2. A fastening device as claimed in claim 1, wherein said one of the gripping means includes at least two reliefs aligned along the longitudinal axis of the strap.

3. A fastening device as claimed in claim 1 wherein said relief is constituted by a substantially truncated cone-shaped deformation formed in the strap.

4. A fastening device as claimed in claim 1 wherein said relief is formed on the outer face of the strap when said strap is wound about said object.

5. A fastening device as claimed in claims 1, 2, 3, or 4, wherein said relief comprises a substantially truncated cone-shaped outer portion and a cup-shaped inner portion in said cone-shaped outer portion for increasing the mechanical resistance of said peripheral portion to being torn.

* * * * *